US010853717B2

(12) United States Patent
Abramson et al.

(10) Patent No.: US 10,853,717 B2
(45) Date of Patent: Dec. 1, 2020

(54) CREATING A CONVERSATIONAL CHAT BOT OF A SPECIFIC PERSON

(71) Applicant: Microsoft Technology Licensing, LLC, Redmond, WA (US)

(72) Inventors: Dustin I Abramson, Bellevue, WA (US); Joseph Johnson, Jr., Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 873 days.

(21) Appl. No.: 15/484,470

(22) Filed: Apr. 11, 2017

(65) Prior Publication Data
US 2018/0293483 A1 Oct. 11, 2018

(51) Int. Cl.
G06N 3/00 (2006.01)
H04L 12/58 (2006.01)
G06N 20/00 (2019.01)

(52) U.S. Cl.
CPC ............. G06N 3/006 (2013.01); G06N 20/00 (2019.01); H04L 51/02 (2013.01); H04L 51/04 (2013.01); H04L 51/32 (2013.01)

(58) Field of Classification Search
CPC .................................................. G06F 16/3329
USPC ..................................................... 706/15, 45
See application file for complete search history.

(56) References Cited

U.S. PATENT DOCUMENTS 8,433,344 B1 * 4/2013 Virga .................. G09B 29/106
455/457
8,719,200 B2 5/2014 Beilby et al.
8,819,549 B2 8/2014 Nageswaram et al.
9,514,748 B2 12/2016 Reddy et al.
2002/0010584 A1 1/2002 Schultz et al.
2009/0254417 A1* 10/2009 Beilby .................. G06N 3/004
706/45
2013/0257877 A1 10/2013 Davis
(Continued)

FOREIGN PATENT DOCUMENTS

WO 2003073417 A2 9/2003

OTHER PUBLICATIONS

Wang, et al., "High Quality Lip-Sync Animation for 3d Photo-Realistic Talking Head", In Proceedings of IEEE International Conference on Acoustics, Speech and Signal Processing, Mar. 25, 2012, pp. 4529-4532.
(Continued)

Primary Examiner — David R Vincent
(74) Attorney, Agent, or Firm — Merchant & Gould P.C.

(57) ABSTRACT

Examples of the present disclosure describe systems and methods of creating a conversational chat bot of a specific person. In aspects, social data (e.g., images, voice data, social media posts, electronic messages, written letters, etc.) about the specific person may be accessed. The social data may be used to create or modify a special index in the theme of the specific person's personality. The special index may be used to train a chat bot to converse in the personality of the specific person. During such conversations, one or more conversational data stores and/or APIs may be used to reply to user dialogue and/or questions for which the social data does not provide data. In some aspects, a 2D or 3D model of a specific person may be generated using images, depth information, and/or video data associated with the specific person.

20 Claims, 8 Drawing Sheets

(56) References Cited

U.S. PATENT DOCUMENTS

| | | | |
|---|---|---|---|
| 2014/0118140 A1* | 5/2014 | Amis | G08B 25/08 |
| | | | 340/539.13 |
| 2015/0365395 A1* | 12/2015 | Enriquez | H04L 63/083 |
| | | | 726/5 |
| 2018/0102947 A1* | 4/2018 | Bhaya | H04L 67/2804 |
| 2018/0188905 A1* | 7/2018 | Tran | G06F 3/0488 |
| 2019/0035149 A1* | 1/2019 | Chen | G06K 9/00248 |

OTHER PUBLICATIONS

Wolchover, Natalie, "How the Cleverbot Computer Chats Like a Human", http://www.livescience.com/15940-cleverbot-computer-chats-human.html, Published on: Sep. 7, 211, 3 pages.

"SelenaBot", https://www.producthunt.com/posts/selenabot, Retrieved on: Feb. 27, 2017, 2 pages.

Lasecki, et al., "Real-Time Conversational Crowd Assistants", In Proceedings of Extended Abstracts on Human Factors in Computing Systems, Apr. 27, 2013, 6 pages.

* cited by examiner

CREATING A CONVERSATIONAL CHAT BOT OF A SPECIFIC PERSON

BACKGROUND

A chat robot (chat bot) is a conversational computer program that simulates human conversation using textual and/or auditory input channels. Typically, chat bots are implemented in dialogue systems and natural language processing systems to perform various practical tasks (e.g., customer support, information acquisition, etc.). In such implementations, chat bots are trained using data conversational dialogue samples from various users and user sessions. As such, the chat bots in these implementations represent a generic, normalized version of the personalities and attributes of the entire sampled user base.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods of creating a conversational chat bot of a specific person (or specific entity). In aspects, social data (e.g., images, voice data, social media posts, electronic messages, written letters, etc.) relating to the specific person may be accessed. The social data may be used to create or modify a special index in the theme of the specific person's personality. The special index may be used to train a chat bot to converse and interact in the personality of the specific person. During such conversations, one or more conversational data stores and/or APIs may be used to reply to user dialogue and/or questions for which the social data does not provide data. In some aspects, a voice font of the specific person may be generated using recordings and sound data related to the specific person. In some aspects, a 2D or 3D model of the specific person may be generated using images, depth information, and/or video data associated with the specific person.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
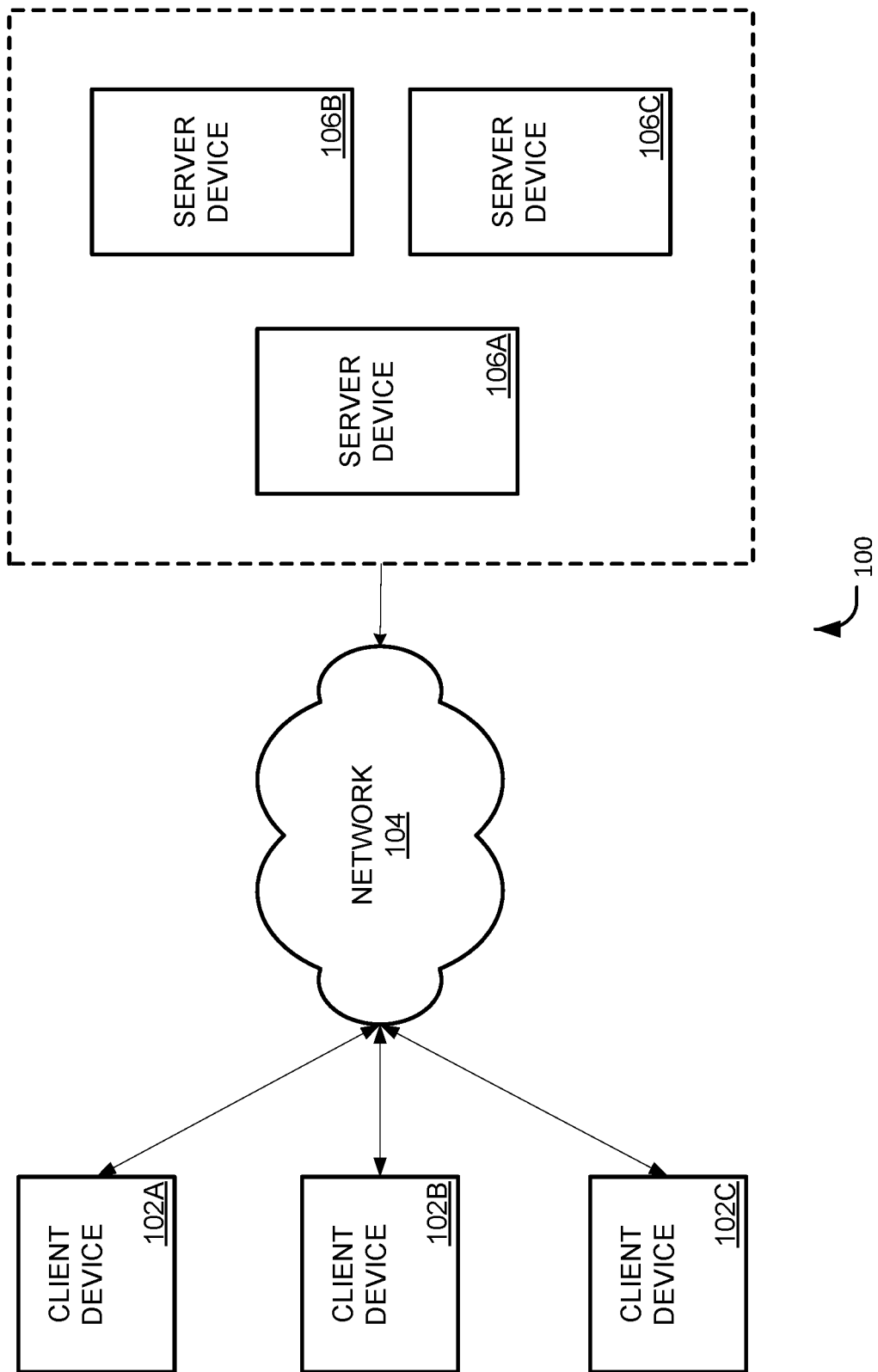
FIG. 1 illustrates an overview of an example system for creating a conversational chat bot of a specific person as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of creating a conversational chat bot of a specific person (or specific entity). In aspects, social data relating to the specific person may be accessed. In examples, the specific person may correspond to a past or present entity (or a version thereof), such as a friend, a relative, an acquaintance, a celebrity, a fictional character, a historical figure, a random entity, etc. The specific person may also correspond to oneself (e.g., the user creating/training the chat bot), or a version of oneself (e.g., oneself at a particular age or stage of life). Social data, as used herein, may refer to images, image data, voice data, emails, text messages, dialogue data/commands, social media posts, written letters, user profile information, behavioral data, transactional data, geolocation data, and other forms of data about a specific person. In examples, social data may be stored by, and/or collected from, various data sources. The social data (or portions thereof) may be used to create or modify a personalized chat index in the theme of the specific person's personality. A chat index, as used herein, may refer to a repository of conversational data. In examples, creating/modifying the personalized chat index may comprise applying one or more rule sets or machine learning to the social data of a specific person.

In aspects, a personalized chat index may be used to train a chat bot or language understanding (LU) model to converse and/or interact in the personality of the specific person. A model, as used herein, may refer to a predictive or statistical language model that may be used to determine a probability distribution over one or more word, character sequences or events, and/or to predict a response value from one or more predictors. In examples, a model may be a rule-based model, a machine-learning regressor, a machine-learning classifier, a neural network, or the like. In some aspects, conversing in the personality of a specific person may include determining and/or using conversational attributes of the specific person, such as style, diction, tone, voice, intent, sentence/dialogue length and complexity, topic, and consistency. Conversing in the personality of a specific person may additionally include determining and/or using behavioral attributes (e.g., user interests, opinions, etc.) and demographic information (e.g., age, gender, education, profession, income level, relationship status, etc.) of the specific person and/or persons determined to be similar to the specific person. In some aspects, during conversations with the chat bot or LU model, one or more conversational data stores and/or APIs may be used to reply to user dialogue and/or questions for which the social data does not provide data. The conversational data stores may comprise, for example, crowd-sourced conversational data from dialogues, interactions, and/or transactions collected from various data sources. The crowd-sourced conversational data may comprise labeled and/or unlabeled data, training data, and the like. In examples, various learning techniques (e.g., deep learning, heuristics, etc.) may be applied to the conversational data to determine the conversational data source to use during a particular portion of a dialogue associated with a chat bot.

In aspects, a voice font of a specific person may be generated by applying speech recognition and/or a speech synthesis algorithm to one or more voice recordings in the social data. The voice recordings may be collected from the social data, one or more Internet of Things ("IoT") data sources (such as personal digital assistants, natural language understanding systems, etc.), and the like. The voice font may be applied to the chat bot of a specific person. In aspects, a two-dimensional ("2D") image of a specific person may be generated by applying a facial recognition/detection algorithm to one or more photos in the social data and/or collected from one or more other data sources. The 2D image may be applied to the chat bot of a specific person to create a more realistic, human-like chat experience. In some aspects, a 2D model (or a portion of the data used to create the 2D model) of a specific person may be used to generate a three-dimensional ("3D") model of the specific person. For example, one or more images, depth information and/or color information may be provided as input(s) to a 3D modelling algorithm. The 3D modelling algorithm may generate a 3D model and facilitate the application of the 3D model to the chat bot of a specific person. The 3D model may provide for a more immersive and interactive experience (e.g., in a virtual reality, augmented reality, or mixed reality context) for a user interacting with the chat bot.

Accordingly, the present disclosure provides a plurality of technical benefits including but not limited to: creating a conversational experience with a specific person; analyzing social data of a specific person to create a personalized personality index; supplementing a personalized personality index using data from a conversational repository; using a personalized personality index to train a chat bot; creating an accurate voice font using recordings of a specific person; applying a voice font of a specific person to a chat bot of the specific person; generating a 3D model of a specific person; and applying a 3D of a specific person to a chat bot of the specific person, among other examples.

FIG. 1 illustrates an overview of an example system for creating a conversational chat bot of a specific person as described herein. Example system 100 may be a combination of interdependent components that interact to form an integrated whole for performing task management. In aspects, system 100 may include hardware components (e.g., used to execute/run an operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 4-7. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch, and text input. In examples, one or more portions of the input may correspond to social data associated with one or more people/entities. Client devices 102A-C may store the social data and/or provide access to data sources comprising social data for the one or more people/entities. The data sources may be located on, or accessible to, server devices 106A-C via network 104. As an example, client devices 102A-C may provide access to social media data, user profile data, and image data for one or more people/entities. Such data may be locally stored on client devices 102A-C, or on one or more of server devices 106A-C. In some aspects, client devices 102A-C may have access to a personality index (or an instance thereof). The personality index may be a generic personality index or a personalized personality index. A generic personality index, as used herein, may comprise social data corresponding to a set of training data, a generic user, or a multitude of anonymous users. A personalized personality index, as used hereon, may comprise social data for one or more people/entities, one or more algorithms for processing social data and events (e.g., textual data, handwritten data, images, voice data, historical events, etc.), and processed data (e.g., dialogue slots and corresponding data, event and dialogue hypotheses, time period information, image tags and descriptions, voice font data, 2D/3D information, etc.). Client devices 102A-C may configure a generic personality index by applying social data to the generic personality index. For example, social data for a specific person may be applied to a generic personality index, thereby creating a personalized personality index for the specific person. In some aspects, the personalized personality index may change or evolve over time as social data and similar information is altered (e.g., added, modified, or removed) in the personalized personality index.

In aspects, client devices 102A-C may provide a personality index (or portions thereof) and/or a personalized personality index (or portions thereof) to a chat bot or LU model. The chat bot/LU model may be located locally, on a server device, or some combination thereof. The chat bot/LU model may use the personality index as input to train the chat bot to interact in accordance with one or more personalities in the personality index. For example, client devices 102A-C may provide a personalized personality index to a chat bot. The chat bot may be trained using the personalized personality index to interact conversationally in the personality of the specific person associated with the personalized personality index. An instance of the trained, personalized chat bot may be transmitted to one or more client devices and/or server devices. In some aspects, client devices 102A-C may have access to a one or more chat indexes. A chat index, as used herein, may refer to a repository of conversational data comprising social data and/or conversational algorithms associated with a plurality of users, events and conversational scenarios. As an example, a chat index may comprise question and answer information from a specific person, question and answer information from a person or entity determined to be similar to the specific person, crowd-based question and answer information from a group of users or a portion of an overall community (e.g., crowd-sourced data), general information related to a specific person, generic information relating to a particular topic or time period (but unrelated to a specific person), scripted and/or pre-generated automated questions/replies, labeled data, voice data, image data, etc. In examples, the client devices 102A-C may use a chat index to supplement informational gaps and/or discrepancies in the chat bot/LU model knowledge base. For instance, client devices 102A-C may enable a chat bot to directly access or query a chat index (or an associated service) to determine an answer or an appropriate response for a specific person personified by the chat bot.

In aspects, client devices 102A-C may provide for creating and/or applying a voice font to a chat bot. For example, client devices 102A-C may access voice data (e.g., voice recordings, musical recordings, etc.) comprised in social data, a personality index or other data sources. Speech recognition and/or speech synthesis techniques may be applied to the voice data to create a voice font of a specific person. The models and/or algorithms for implementing such techniques may be provided by client devices 102A-C, server devices 106A-C, or a separate device/service. The voice font may then be applied to a chat bot to enable the chat bot to converse in the voice of a specific person. In some aspects, client devices 102A-C may further provide for creating and/or applying a 2D or 3D model of a specific person to a chat bot. For example, client devices 102A-C may access image data to create a 2D model of the specific person. Additionally or alternatively, client devices 102A-C may access image data and/or 3D data (e.g., photos, images, depth information, color information, mapping information, etc.) comprised in social data, a personality index or other data sources. The image data and/or 3D data may be applied to a 3D modelling algorithm or service to create a 3D model of a person or entity. Alternately, client devices 102A-C may access a 3D modelling device. The 3D modelling device may be configured to perform a 3D scan of a person or entity, and/or access one or more previous 3D scans. In examples, a 2D or 3D model may be applied to a chat bot to enable immersive interactions with the likeness of a specific person/entity.

Figure 2:
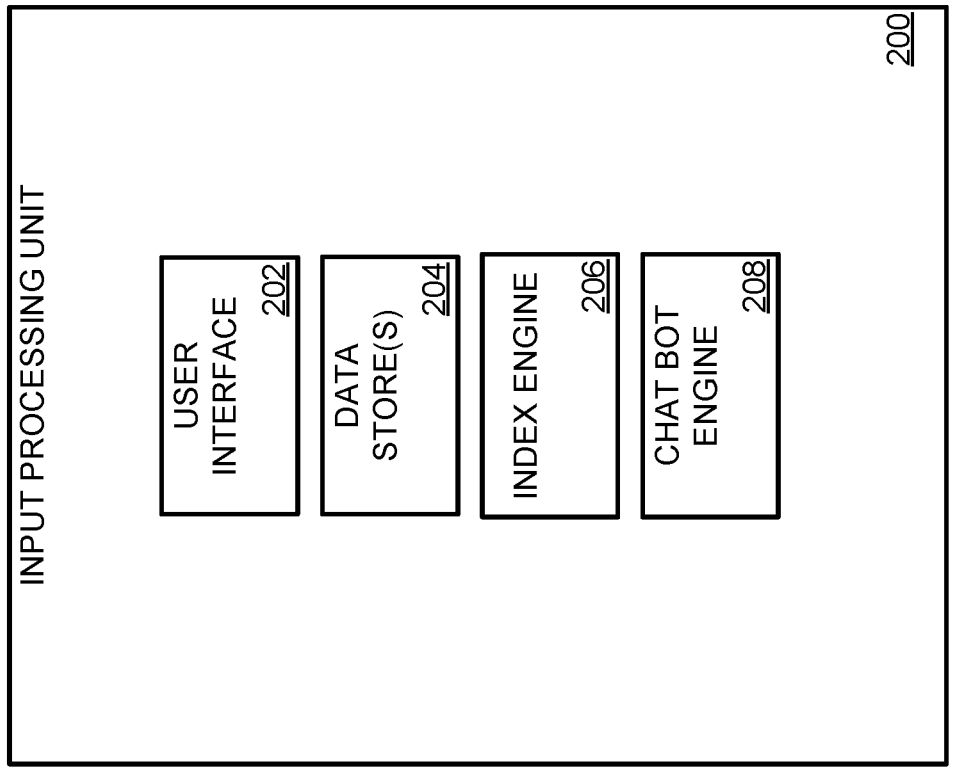
FIG. 2 illustrates an example input processing unit for creating a conversational chat bot of a specific person as described herein.

FIG. 2 illustrates an overview of an exemplary input processing unit 200 for creating a conversational chat bot of a specific person, as described herein. The conversational chat bot creation techniques implemented by input processing unit 200 may comprise the techniques and input described in FIG. 1. In alternative examples, a single system (comprising one or more components such as processor and/or memory) may perform the methods and processes described in systems 100 and 200, respectively.

With respect to FIG. 2, input processing unit 200 may comprise user interface 202, data store(s) 204, index engine 206, and chat bot engine 208. Interface 202 may be configured to receive, store and provide access to content, such as social data for one or more people or entities. In aspects, interface 202 may access various data sources comprising social data relating to one or more people or entities. Such data sources may include social media websites, search engines, content/resource providers, user profiles/accounts, image/photo repositories, voice recordings, musical recordings, print sources (e.g., books, magazines, newspapers, etc.), handwritten letters, narrative accounts of events, a chat index of conversational data, labeled/unlabeled training data sets, etc. Interface 202 may collect social data from one or more data sources in response to a query associated with one or more specific people. The collected data may be stored by a data store accessible to interface 202, such as data store(s) 204. Data store(s) 204 may be configured to store and/or organize data according to various criteria. For instance, data store(s) 204 may store social data by a user identification of a specific person associated with the social data, date/time, social data subject/topic, social data type, or the like.

Index engine 206 may be configured to create a personality index. In aspects, index engine 206 may receive a request to generate a personality index. The request may be associated with one or more specific people or entities. In examples, a request may be transmitted to index engine 206 via interface 202, or received directly via an interface component accessible by a client or client device. In response to receiving the request, index engine 206 may access social data collected by interface 202 and/or stored by data store(s) 204. Index engine 206 may search for and collect social data associated with the one or more specific people or entities identified in the request. The social data associated with the one or more specific people or entities ("personalized data") may be combined with a personality index (or a generic personality index) and processed to facilitate the creation of a personalized personality index (e.g., a personality index corresponding to the personalized data for the specific person/entity). In some aspects, processing the personalized data may comprise identifying and categorizing conversation data (e.g., explicit question/answer data, inferred question/answer data, historical event facts and hypotheses, etc.) collected for a specific person/entity.

Processing the personalized data may further comprise determining and categorizing conversation data associated with people/entities similar to the specific person/entity identified in the request. In examples, determining similarities between a specific person/entity and another person/entity (e.g., the "other person") may include using machine learned techniques and/or natural language processing techniques to analyze and compare the social data of the other person. Such an analysis/comparison may include the use of latent semantic indexing, latent Dirichlet processing, word and/or sentence embedding models, collaborative filtering techniques, entity graphs, Jaccard similarity, cosine similarity and/or translation models. Such an analysis/comparison may further include the use of approval indicators (e.g., "likes"/"dislikes," display screen swipes, ratings, reviews, comments, watch lists, etc.) for social media data, music data, image data, etc. In at least one example, the analysis may include comparing one or more characteristics (e.g., traits, attributes, events, etc.) of the specific person/entity with the other person. Such characteristics may include demographic data (e.g., age, gender, income, employment, education, time period of lifetime, etc.), behavioral data (e.g., access dates/times, transaction trends, purchase history, frequented sites, dwell times, click data, etc.), stylistic content of data (e.g., style, diction, tone, voice, intent, sentence/dialogue length and complexity, etc.), psychographic data (e.g., user interests, opinions, likes/dislikes, values, attitudes, habits, etc.), and the like. In such an example, at least a subset of the characteristics may be provided to a scoring or comparison algorithm/model for evaluation. The scoring or comparison algorithm/model may generate and/or assign scores or labels to the evaluated characteristics. The scoring or comparison algorithm/model may use the generated scores/labels to determine a similarity score or metric for the other person. The similarity score/metric may represent the estimated similarity between a specific person/entity and the other person/entity. In aspects, the processed personalized data may be used to create, organize, populate or update a personalized personality index for the specific person/entity identified in the request.

Index engine 206 may be further configured to access one or more conversational data sources and/or APIs. In aspects, index engine 206 may have access to one or more data sources comprising crowd-sourced conversation data. The crowd-sourced conversation data may be used to supplement the data in a personality index. The crowd-sourced conversation data may comprise social data collected/derived from a plurality of users and relating to one or more specific people/entities, events, time periods, and/or conversational scenarios. The crowd-sourced conversation data may additionally comprise conversational algorithms/models for processing the social data comprised in the crowd-sourced conversation data. In examples, the crowd-sourced conversation data may be collected from various online and offline sources, and stored in, for example, a crowd-sourced chat index. The crowd-sourced chat index may include crowd-based perceptions, opinions and knowledge regarding the actions, communications and/or events relating to one or more specific people/entities, a period of time, or one or more events. For example, if the specific person is/was a public figure, there may be publically-available information (e.g., Wikipedia articles, biographies/autobiographies, print/audio/video news stories, podcasts, etc.) regarding the specific person. The publically-available information (or portions thereof) may be used to populate a crowd-sourced chat index.

In aspects, index engine 206 may additionally or alternately have access to one or more data sources comprising generic conversation data. The generic conversation data may be used to address dialogue input for which a personality index and a data source comprising crowd-sourced conversation data is unable to provide an answer or data. The generic conversation data may comprise scripted and/or pre-generated automatic questions/replies, generic conversational and time period-based algorithms/models, and personality-neutral social data. That is, the generic conversation data may not be associated (or associable) with a specific person/entity. In examples, the generic conversation data may be manually or automatically generated, selected or stored in, for example, a generic chat index. The generic chat index may include generic or theoretical opinions and knowledge regarding the actions, communications and/or events relating to one or more generic people/entities or topics. For example, if the specific person is/was not a public figure or otherwise well-known, there may be little or no publically-available information regarding the specific person. A generic chat index, however, may comprise a generic or pre-scripted answer to a topic or subject identified in a corresponding dialogue request. Alternately, the generic chat index may comprise logic for composing one or more questions directed to soliciting information from a user or the specific person/entity. Information obtained as a result of posing the one or more questions to users or the specific person/entity may be provided to one or more chat indexes and processed accordingly.

Chat bot engine 208 may be configured to generate a chat bot or LU model. In aspects, input processing unit 200 may cause chat bot engine 208 to generate one or more chat bots (or instances thereof). Input processing unit 200 may then cause or facilitate the application of data from a personality index to the one or more generated chat bots. In examples, applying personalized data to a chat bot may generate a personalized chat bot configured to interact conversationally in the personality of a specific person/entity. Applying personalized data to a chat bot may also cause a voice font, a 2D image, or a 3D model of a specific person/entity to be applied to the chat bot. Chat bot engine 208 may be further configured to establish a set of interaction rules for a chat bot or LU model. In aspects, the set of interaction rules may provide for determining when (and in what order) to utilize the data and various data sources available to index engine 206. As an example, chat bot engine 208 may establish a rule set dictating that, in response to receiving dialogue input, a specific chat bot may attempt to provide a response using data from the following data sets (in order): 1) social data from a specific person/entity, 2) social data from users similar to the specific person/entity, 3) social data from a global user base (such as the internet at large) that may or may not be similar to the specific person/entity, and 4) generic, catch all phrases/questions that are not specific to the specific person/entity. As another example, in response to receiving dialogue input, chat bot engine 208 may provide the received dialogue input to a machine learning model for processing dialogue. The machine learning model may then apply decision logic to determine a hierarchal data traversal process for collecting reply data. In such aspects, chat bot engine 208 may associate one or more established rule sets (or models) with a corresponding personalized chat bot, and facilitate the deployment and/or implementation of the chat bot and rule set (or model) to one or more computing device, services or user accounts.

Figure 3:
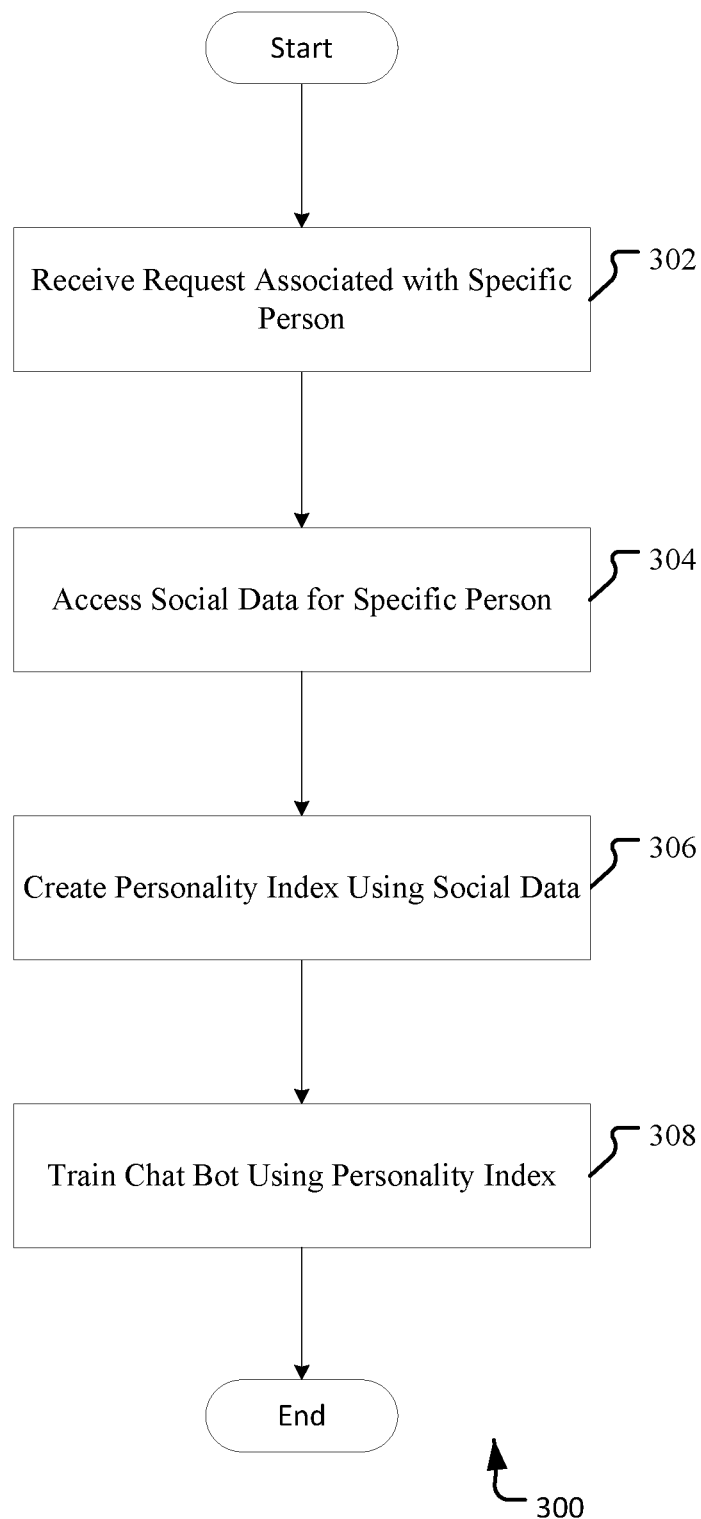
FIG. 3 illustrates an example method of creating a conversational chat bot of a specific person as described herein

FIG. 3 illustrates an example method of creating a conversational chat bot of a specific person as described herein. In aspects, method 300 may be executed by an exemplary system such as system 100 of FIG. 1. In examples, method 300 may be executed on a device comprising at least one processor configured to store and execute operations, programs or instructions. However, method 300 is not limited to such examples. In other examples, method 300 may be performed on an application or service for creating and/or implementing a conversational chat bot or LU model. In at least one example, method 300 may be executed (e.g., computer-implemented operations) by one or more components of a distributed network, such as a web service/distributed network service (e.g. cloud service).

Example method 300 begins at operation 302 where a request associated with a specific person or entity is received. In aspects, a computing device, such as input processing unit 200, may receive a request to generate, train or modify a chat bot or LU model. The request may comprise information associated with a specific person or entity, such as a name, a nickname, an occupation, an associated time period (e.g., lifetime, period in office, playing career, etc.), a description, etc. The information may be used to identify one or more data sources comprising (or potentially comprising) data related to the specific person or entity. At operation 304, social data for the specific person/entity may be accessed. In aspects, one or more queries may be generated and submitted to the one or more identified data sources. Generating queries may comprise identifying keywords or terms in a request, and formulating queries based thereon. In response to submitting a query, one or more result sets comprising social data may be generated and received by the computing device. In examples, the social data may comprise information relating to one or more specific people or entities. Such information may include images, image data, voice data, social media posts, written letters, user profile information, behavioral data, transactional data, geolocation data, and other forms of data. As an example, the social data for a current celebrity may include social media posts from (and about) the celebrity, voice and image data (e.g., recordings of interviews, performances, etc.), movies/televisions shows, electronic news and articles about the celebrity, web chatter relating to the celebrity, etc. As another example, the social data for a historical figure (such as Abraham Lincoln) may include handwritten letters and similar correspondences authored by the historical figure, books authored or about the historical figure, information related to the relevant time period associated with the historical figure, physical media comprising audio data and/or video data, photos, etc. In such aspects, the social data (or portions thereof) may be stored in a data store accessible to the computing device, such as data store(s) 204.

At operation 306, a personality index may be created using social data. In aspects, a computing device may have access to index-generation component, such as index engine 206. The index-generation component may have access to one or more sources of social data, such as data store(s) 204. In examples, the computing device may cause the index-generation component to generate a personality index (or an instance thereof) as part of receiving the request received at operation 302. The computing device may provide the index-generation component information identifying a specific person or entity. As a result, the index-generation component may identify and/or collect data related to the identified specific person/entity from the one or more sources of social data. The identified/collected data may then be processed and applied to the personality index (e.g., a generic personality index); thereby, creating a personalized personality index in the theme of the specific person/entity. For example, a machine learning model may analyze a set of social data to identify and categorize content, content attributes, content authors/contributors, data sources, etc. Such an analysis may include categorizing the social data by type (e.g., textual data, audio data, image data, etc.), determining the source/author(s) of the social data (e.g., a specific person/entity, one or more other persons similar to a specific person/entity, subject matter experts, random users, etc.), determining the degree of similarity between a specific person/entity and alternate sources/authors, identifying question and answer pairs, identifying dialogue expressions, etc. The analysis of social data may also include evaluating photo data in (or associated with) the social data. Such an evaluation may include using, for example, deep learning to detect tags in (and/or attributes of) the photo data, process (e.g., identify, annotate, summarize, etc.) the events in the photo data, and/or correlate the detected tags with the processed photo data. The analysis of social data may further include evaluating voice data in (or associated with) the social data. Such an evaluation may include using speech recognition and/or speech syntheses techniques to generate a voice font corresponding to a specific person/entity. Further still, the analysis of social data may include generating and/or evaluating 2D/3D data in (or associated with) the social data. Such an evaluation may include using 2D/3D modelling techniques (and associated data) to generate a 2D or 3D model corresponding to a specific person/entity.

In some aspects, a personality index may comprise (or be associated with) one or more data processing algorithms or models for processing data, such as social data and event data. As an example, the data processing algorithms/models may correspond to a set of interaction rules for using one or more datasets associated with a specific person/entity. Such interaction rules may include criteria for accessing one or more datasets, a preferred order of accessing one or more datasets (e.g., first preference: social data from a specific person/entity; second preference: social data from users similar to the specific person/entity; third preference: social data from a global user base; etc.), criteria for determining whether the specific person/entity is a present or historical figure, etc. As another example, the data processing algorithms/models may correspond to image classification rules/algorithms. Such image classification rules/algorithms may dictate the processing and analysis of image data. For instance, a personalized personality index may comprise an unlabeled photo of a person surfing. An image classification algorithm may be applied to the photo to determine the subject of the photo or an action associated with the photo (e.g., "person surfing"). A facial recognition algorithm may be applied to the person in the photo. The data resulting from the facial recognition analysis may be compared to labeled image data accessible to the personalized personality index. A label may be applied to the person in the photo based on the comparison (e.g., "John surfing"). An image analysis technology may also be applied to the photo. The image analysis technology may analyze the metadata of the photo to identify, for example, an associated geotag. The associated geotag may then be applied to the photo (e.g., "John surfing in Hawaii"). In such an example, additional data from a device associated with the photo (e.g., the originating device) may be stored in the personalized personality index and used in the analysis of the photo. Such additional data may include data from one or more sensors of the device. Examples of sensors may include a GPS sensor, a proximity sensor, an accelerometer sensor, a gyroscopic sensor, a force sensor, an acoustic sensor, a touchscreen sensor, an optical sensor, and a localization sensor. One of skill in the art will appreciate that other types of sensors may also be used. As yet another example, the data processing algorithms/models may correspond to data acquisition rules/algorithms. Such data acquisition rules may provide for soliciting/acquiring data (e.g., in the form of questions to the user) from a user (e.g., the specific person/entity, the user interacting with the chat bot, etc.) or from data sources identified by a user. For instance, a personalized personality index may comprise social data relating to a deceased relative of a user. Although the social data may comprise information from the lifetime of the deceased relative, the social data may not comprise information related to a time period after the lifetime of the deceased relative. As a result, a set of data acquisition rules may be generated for (or assigned to) the personalized personality index. The set of data acquisition rules may provide instructions for acquiring data related to various time periods of the deceased relative's lifetime (e.g., before, during and/or after the lifetime). Such instruction may include asking a user questions about a time period, one or more events and/or people, or asking a user where such information may be obtained. In such an example, such questions may indicate the specific person represented by the personalized personality index (e.g., the deceased relative) possesses a perceived awareness that he/she is, in fact, deceased.

At operation 308, a chat bot or LU model may be trained using a personality index (or personalized personality index). In aspects, a computing device may have access to a conversational computer program, such as chat bot engine 208. The conversational computer program may have access to one or more personality indexes. In examples, the computing device may cause the conversational computer program to generate a chat bot/LU model (or an instance thereof) as part of receiving the request at operation 302. A personality index (or a portion of the data therein) may be provided as input to a generated chat bot/LU model to train the chat bot/LU model. For example, a chat bot may be trained using processed social data and one or more data processing algorithms or rule sets. The trained chat bot/LU model may be operable to interact conversationally in the personality of a specific person/entity associated with the personalized personality index. Interacting conversationally may include determining the a subject and/or intent for one or more expressions of a dialogue, identifying a data source comprising response data, determining whether response data is present in accessible data sources, generating and posing questions to supplement gaps and/or verify data in the data source data, etc. In at least one example, the trained chat bot/LU model may be additionally or alternatively operable to provide additional functions, such as replying to emails and social media posts, answering voice calls and providing voicemails, serving as a personal digital assistant, storing reminders or messages, etc. In some aspects, training a chat bot/LU model may additionally include applying one or more visual or auditory characteristics or attributes to a chat bot/LU model. For example, a personality index may include (or have access to) a voice font, a 2D image and/or a 3D model of a specific person/entity associated with the personalized personality index. The voice font, a 2D image and/or a 3D model may be applied to the chat bot/LU model to provide a more immersive user experience for users interacting with the chat bot/LU model.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
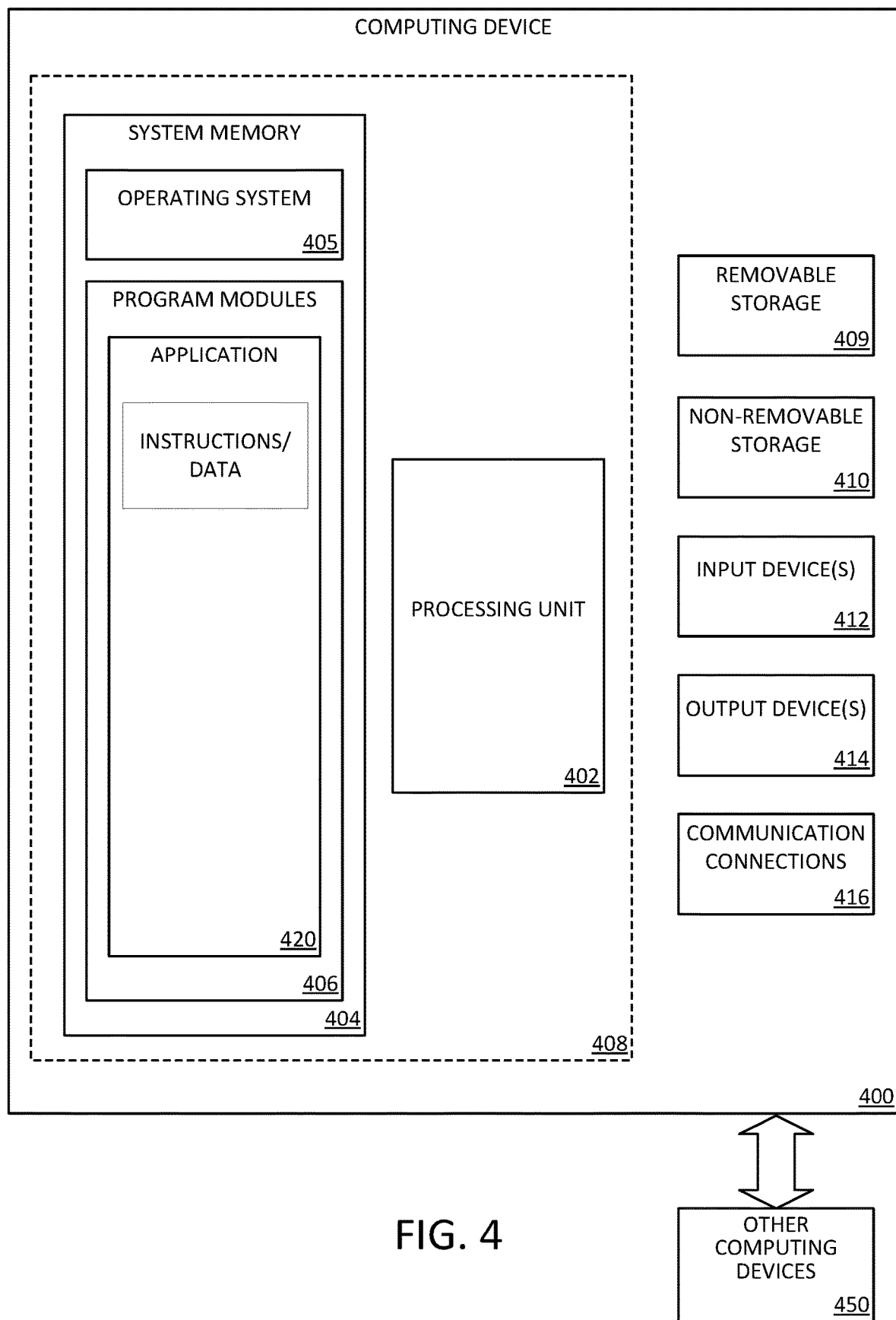
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices described above, including the client computing devices 102A-C and the server computing devices 106A-C. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running software application 420, such as one or more components supported by the systems described herein. As an example, system memory 404 may store social data (e.g., images, image data, voice data, emails, text messages, dialogue data/commands, social media posts, written letters, user profile information, behavioral data, transactional data, geolocation data, etc.), personality index data and instructions for creating a conversational chat bot of a specific entity. The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
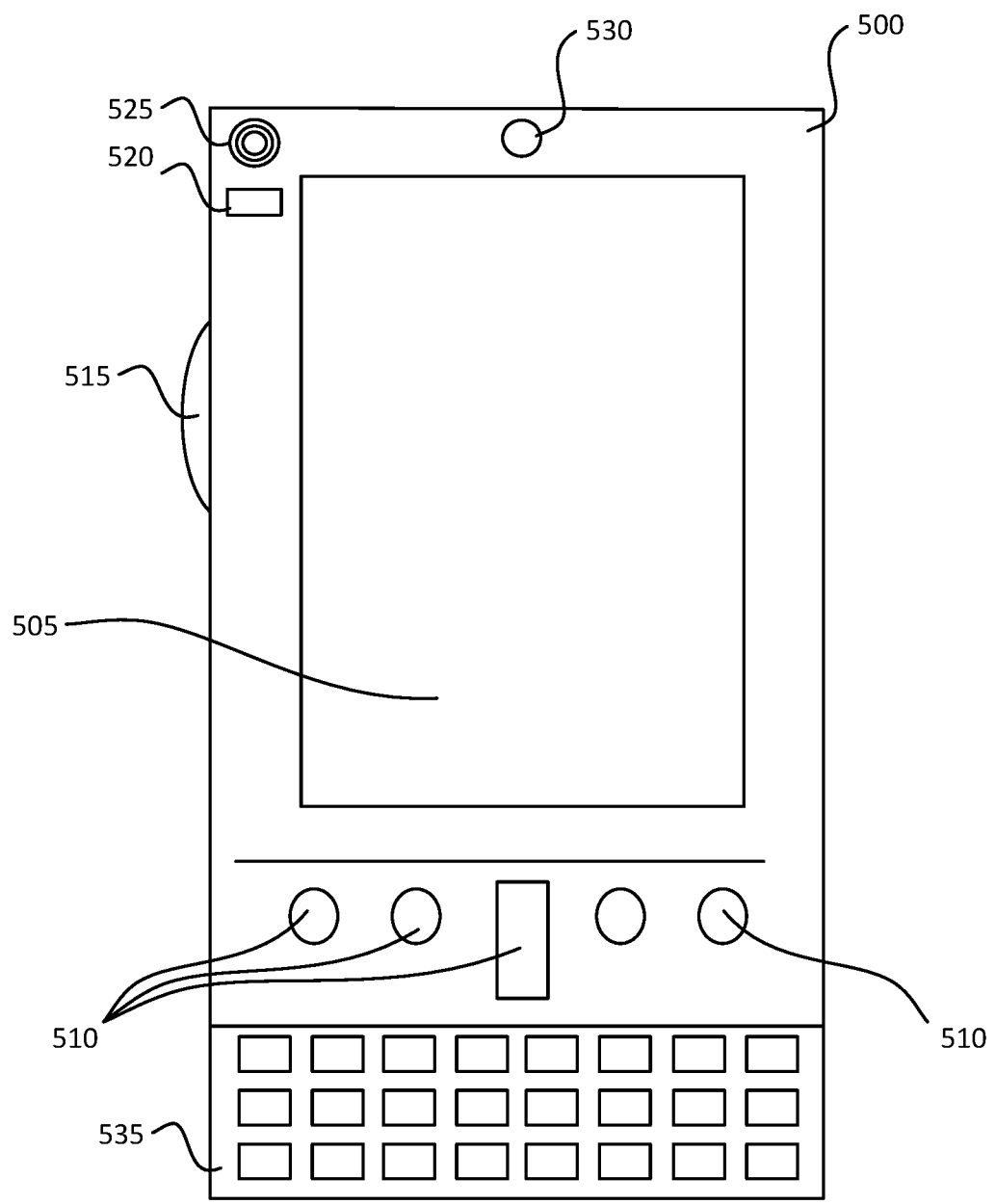
FIGS. 5A and 5B are simplified block diagrams of a mobile computing device with which aspects of the present disclosure may be practiced.
Figure 5B:
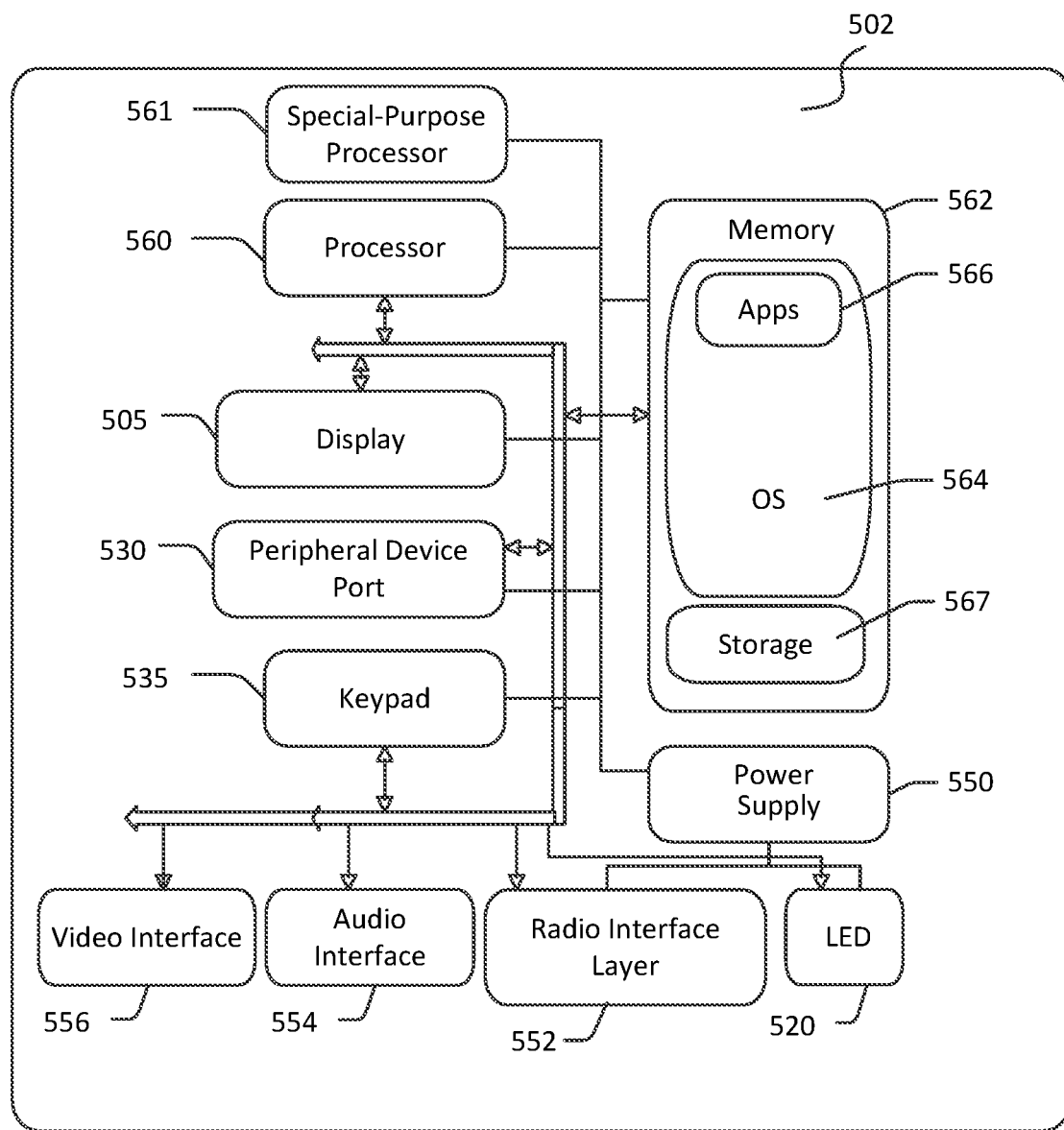

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 567 within the memory 562. The non-volatile storage area 567 may be used to store persistent information that should not be lost if the system 502 is powered down. The application programs 566 may use and store information in the non-volatile storage area 567, such as e-mail or other messages used by an e-mail application, and the like. A synchronization application (not shown) also resides on the system 502 and is programmed to interact with a corresponding synchronization application resident on a host computer to keep the information stored in the non-volatile storage area 567 synchronized with corresponding information stored at the host computer. As should be appreciated, other applications may be loaded into the memory 562 and run on the mobile computing device 500 described herein.

The system 502 has a power supply 550, which may be implemented as one or more batteries. The power supply 550 might further include an external power source, such as an AC adapter or a powered docking cradle that supplements or recharges the batteries.

The system 502 may also include a radio interface layer 552 that performs the function of transmitting and receiving radio frequency communications. The radio interface layer 552 facilitates wireless connectivity between the system 502 and the "outside world," via a communications carrier or service provider. Transmissions to and from the radio interface layer 552 are conducted under control of the operating system 564. In other words, communications received by the radio interface layer 552 may be disseminated to the application programs 566 via the operating system 564, and vice versa.

The visual indicator 520 may be used to provide visual notifications, and/or an audio interface 554 may be used for producing audible notifications via the audio transducer 525. In the illustrated embodiment, the visual indicator 520 is a light emitting diode (LED) and the audio transducer 525 is a speaker. These devices may be directly coupled to the power supply 550 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 554 is used to provide audible signals to and receive audible signals from the user. For example, in addition to being coupled to the audio transducer 525, the audio interface 554 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 556 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 567.

Data/information generated or captured by the mobile computing device 500 and stored via the system 502 may be stored locally on the mobile computing device 500, as described above, or the data may be stored on any number of storage media that may be accessed by the device via the radio interface layer 552 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 552 or via a distributed computing network. Similarly, such data/information may be readily transferred between computing devices for storage and use according to well-known data/information transfer and storage means, including electronic mail and collaborative data/information sharing systems.

Figure 6:
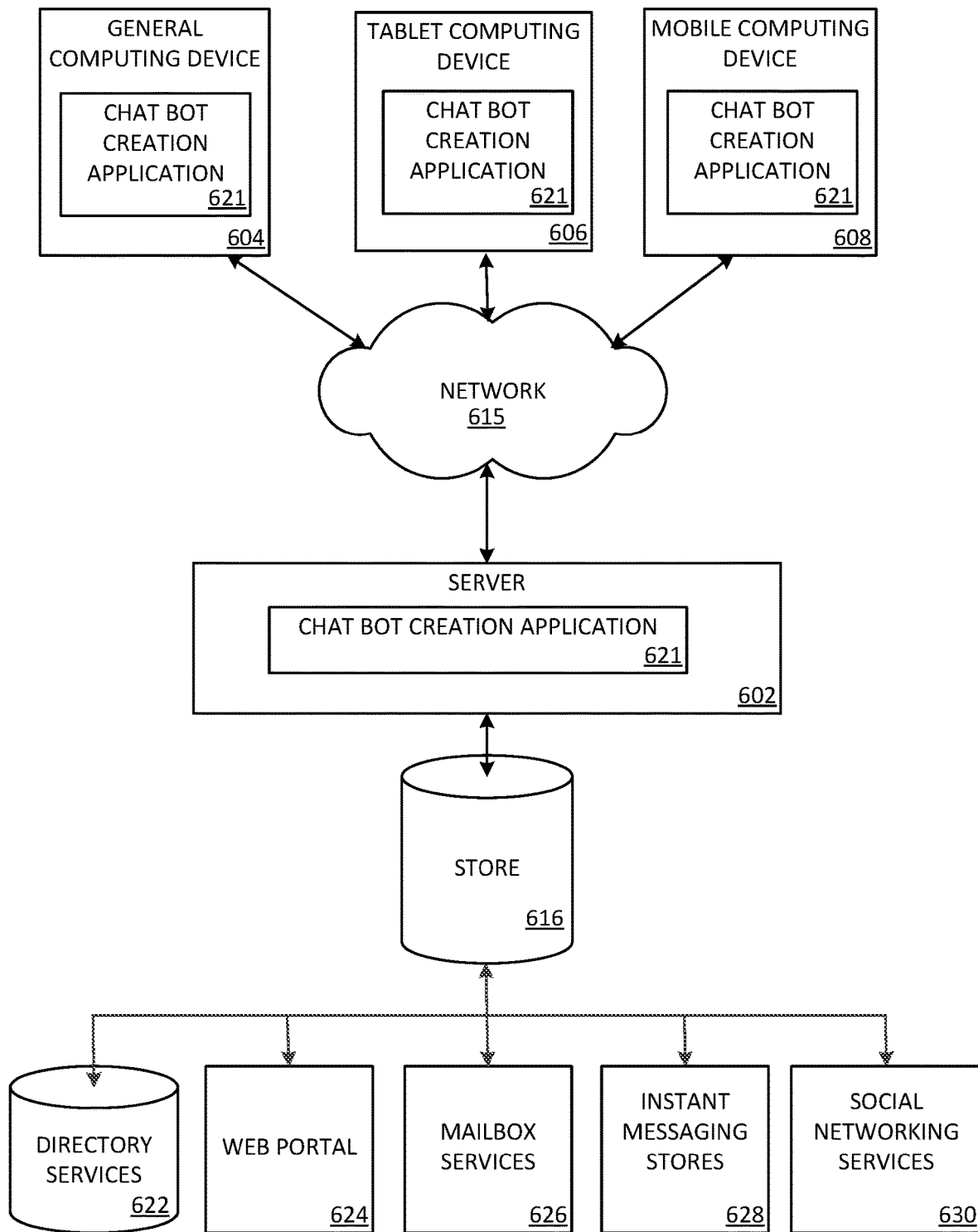
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630. A chat bot creation application 621 may be employed by a client that communicates with server device 602, and/or the chat bot creation application 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
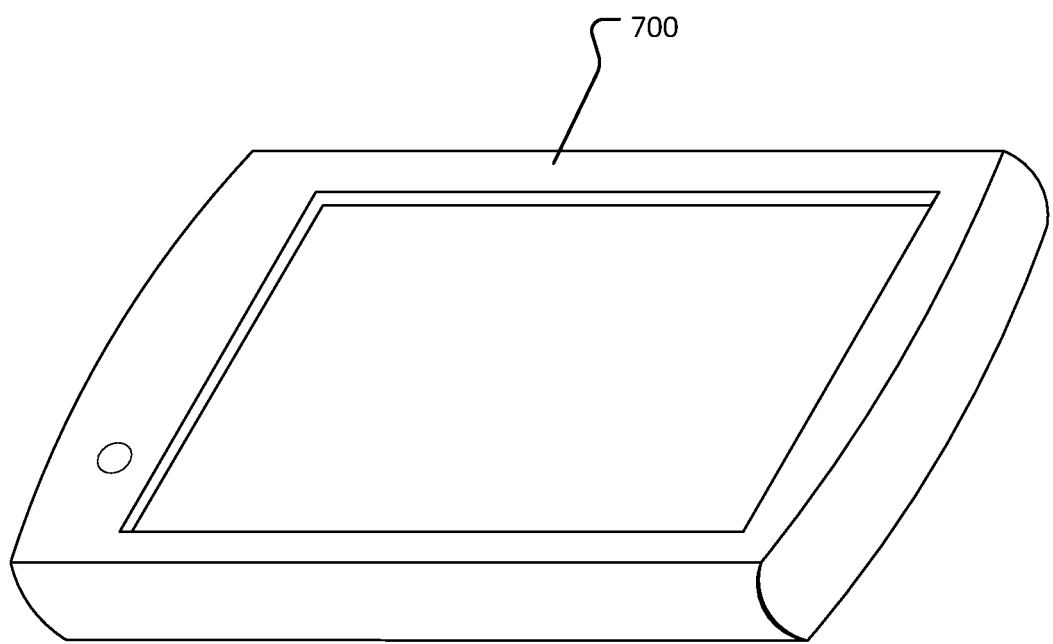
FIG. 7 illustrates a tablet computing device for executing one or more aspects of the present disclosure.

FIG. 7 illustrates an exemplary tablet computing device 700 that may execute one or more aspects disclosed herein.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure provide a system comprising: at least one processor; and memory coupled to the at least one processor, the memory comprising computer executable instructions that, when executed by the at least one processor, performs a method for creating a conversational chat bot of a specific entity, the method comprising: receiving a request associated with a specific entity; accessing social data associated with the specific entity, the social data comprising at least one of images of the specific entity, voice data for the specific entity, conversational data associated with the specific entity, and publicly available information about the specific entity; using the social data to create a personality index, wherein the personality index comprises personality information for the specific entity; and using the personality index to train a chat bot to interact conversationally using the personality of the specific entity. In some examples, the method further comprises using information in the request to identify one or more data sources, wherein the one or more data sources comprise the social data. In some examples, the social data is further based on at least one of social media posts, written letters, user profile information, behavioral data, transactional data, and geolocation data. In some examples, the method further comprises: collecting the accessed social data; storing the accessed social data in a data store; and providing an index generation engine access to the stored social data. In some examples, the method further comprises: processing the social data using at least one of machine learning techniques and one or more rule sets; and applying the processed social data to the personality index to generate a personalized personality index. In some examples, the personality index is associated with one or more data processing algorithms for processing the social data, wherein the one or more data processing algorithms correspond to at least one of chat bot interaction rules, image classification rules, and data acquisition rules. In some examples, training the chat bot comprises applying to the chat bot at least one of a voice font of the specific entity, a 2D image of the specific entity, and a 3D image of the specific entity. In some examples, the method further comprises: submitting dialogue to the chat bot; and generating, by the chat bot, a response to the submitted dialogue, wherein generating the response comprises utilizing a hierarchical data traversal process to collect response data from one or more data sources accessible to the personality index. In some examples, the hierarchical data traversal process comprises evaluating social data from the specific entity, evaluating social data from entities similar to the specific entity, evaluating social data from a global user base, and evaluating generic response options. In some examples, collecting response data comprises: determining, by the chat bot, the personality index does not comprise data for addressing one or more parts of the submitted dialogue; composing, by the chat bot, one or more questions to address the data not comprised in the personality index; and posing, to a user interacting with the chat bot, the one or more questions.

Aspects of the present disclosure further provide a method for creating a conversational chat bot of a specific entity, the method comprising: receiving a request associated with a specific entity; accessing social data associated with the specific entity, the social data comprising at least one of images of the specific entity, voice data for the specific entity, conversational data associated with the specific entity, and publicly available information about the specific entity; using the social data to create a personality index, wherein the personality index comprises personality information for the specific entity; and using the personality index to train a chat bot to interact conversationally using the personality of the specific entity. In some examples, the specific entity corresponds to at least one of a friend, a relative, an acquaintance, a celebrity, a fictional character and a historical figure. In some examples, the personality index provides access to data from the specific entity and to a generalized chat index. In some examples, the method further comprises processing the social data using at least one of machine learning techniques and one or more rule sets, wherein processing the social data comprises identifying conversation data collected for the specific entity and identifying conversation data collected for one or more entities similar to the specific entity. In some examples, identifying conversation data collected for one or more entities similar to the specific entity comprises determining similarities between the one or more entities and the specific entity using at least one of expression analysis techniques, approval indicators, and characteristics comparisons. In some examples, the compared characteristics comprise at least one of demographic data, behavioral data, content style, and psychographic data.

Aspects of the present disclosure further provide a computer-readable storage device storing computer executable instructions that when executed cause a computing system to perform a method for creating a conversational chat bot of a specific entity, the method comprising: receiving a request associated with a specific entity; accessing social data associated with the specific entity, the social data comprising at least one of images of the specific entity, voice data for the specific entity, conversational data associated with the specific entity, and publicly available information about the specific entity; using the social data to create a personality index, wherein the personality index comprises personality information for the specific entity; and using the personality index to train a chat bot to interact conversationally using the personality of the specific entity. In some examples, the personality index is associated with one or more data processing algorithms for processing the social data, wherein the one or more data processing algorithms correspond to at least one of chat bot interaction rules, image classification rules, and data acquisition rules. In some examples, training the chat bot comprises applying to the chat bot at least one of a voice font of the specific entity, a 2D image of the specific entity, and a 3D image of the specific entity. In some examples, the method further comprises: receiving, by the trained chat bot, dialogue from a user via an interface accessible to the computer-readable storage device; and generating, by the chat bot, a response to the received dialogue, wherein generating the response comprises utilizing a data traversal process to collect response data from one or more data sources accessible to the personality index.

Aspects of the present disclosure are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method for creating and interacting with a conversational chat bot of a specific entity, the method comprising:
   receiving a request associated with a specific entity;
   accessing social data associated with the specific entity, the social data comprising at least one of: images of the specific entity, voice data for the specific entity, conversational data associated with the specific entity, and publicly available information about the specific entity;
   using the social data to create a personality index, wherein the personality index comprises personality information for the specific entity;
   using the personality index to train a chat bot to interact conversationally using the personality information of the specific entity;
   receiving, by the chat bot, dialogue;
   generating, by the chat bot, a response to the dialogue using a hierarchical data traversal process to collect response data from one or more data sources accessible to the personality index, wherein collecting the response data comprises:
   determining, by the chat bot, the personality index does not comprise data for addressing one or more parts of the dialogue;
   composing, by the chat bot, one or more questions to address the data not comprised in the personality index; and providing, to a user interacting with the chat bot, the one or more questions.

2. The system of claim 1, the method further comprising using information in the request to identify one or more data sources, wherein the one or more data sources comprise the social data.

3. The system of claim 1, wherein the social data is further based on at least one of social media posts, written letters, user profile information, behavioral data, transactional data, and geolocation data.

4. The system of claim 1, the method further comprising:
collecting the accessed social data;
storing the accessed social data in a data store; and
providing an index generation engine access to the stored social data.

5. The system of claim 1, the method further comprising:
processing the social data using at least one of machine learning techniques and one or more rule sets; and
applying the processed social data to the personality index to generate a personalized personality index.

6. The system of claim 1, wherein the personality index is associated with one or more data processing algorithms for processing the social data, wherein the one or more data processing algorithms correspond to at least one of chat bot interaction rules, image classification rules, and data acquisition rules.

7. The system of claim 1, wherein training the chat bot comprises applying to the chat bot at least one of a voice font of the specific entity, a 2D image of the specific entity, and a 3D image of the specific entity.

8. The system of claim 1, wherein the hierarchical data traversal process comprises evaluating social data from the specific entity, evaluating social data from entities similar to the specific entity, evaluating social data from a global user base, and evaluating generic response options.

9. A method for creating a conversational chat bot of a specific entity, the method comprising:
receiving a request associated with a specific entity;
accessing social data associated with the specific entity, the social data comprising at least one of: images of the specific entity, voice data for the specific entity, conversational data associated with the specific entity, and publicly available information about the specific entity;
processing the social data using at least one of machine learning techniques and one or more rule sets, wherein processing the social data comprises:
identifying conversation data collected for the specific entity;
identifying conversation data collected for one or more entities similar to the specific entity; and
determining similarities between the one or more entities and the specific entity using at least one of expression analysis techniques, approval indicators, and characteristics comparisons;
using the social data to create a personality index, wherein the personality index comprises personality information for the specific entity; and
using the personality index to train a chat bot to interact conversationally using the personality information of the specific entity.

10. The method of claim 9, wherein the specific entity corresponds to at least one of a friend, a relative, an acquaintance, a celebrity, a fictional character and a historical figure.

11. The method of claim 9, wherein the personality index provides access to data from the specific entity and to a generalized chat index.

12. The method of claim 9, the method further comprising processing the social data using at least one of machine learning techniques and one or more rule sets, wherein processing the social data comprises identifying conversation data collected for the specific entity and identifying conversation data collected for one or more entities similar to the specific entity.

13. The method of claim 9, wherein the compared characteristics comprise at least one of demographic data, behavioral data, content style, and psychographic data.

14. A computer-readable storage device storing computer executable instructions that when executed cause a computing system to perform a method for creating a conversational chat bot of a specific entity, the method comprising:
receiving a request associated with a specific entity;
accessing social data associated with the specific entity, the social data comprising one or more images of the specific entity and at least one of voice data for the specific entity, conversational data associated with the specific entity, and publicly available information about the specific entity;
using the social data to create a personality index, wherein the personality index comprises personality information for the specific entity;
using the personality index to train a chat bot to interact conversationally using the personality of the specific entity;
receiving, by the chat bot, dialogue;
generating, by the chat bot, a response to the dialogue using a hierarchical data traversal process to collect response data from one or more data sources accessible to the personality index, wherein collecting the response data comprises:
determining, by the chat bot, the personality index does not comprise data for addressing one or more parts of the dialogue;
composing, by the chat bot, one or more questions to address the data not comprised in the personality index; and
providing, to a user interacting with the chat bot, the one or more questions.

15. The computer-readable storage device of claim 14, wherein the personality index is associated with one or more data processing algorithms for processing the social data, wherein the one or more data processing algorithms correspond to at least one of chat bot interaction rules, image classification rules, and data acquisition rules.

16. The computer-readable storage device of claim 14, wherein training the chat bot comprises applying to the chat bot at least one of a voice font of the specific entity, a 2D image of the specific entity, and a 3D image of the specific entity.

17. The computer-readable storage device of claim 14, the method further comprising:
receiving, by the chat bot, dialogue from a user via an interface accessible to the computer-readable storage device; and
generating, by the chat bot, a response to the received dialogue, wherein generating the response comprises utilizing a data traversal process to collect response data from one or more data sources accessible to the personality index.

18. The system of claim 1, wherein the request comprises at least one of: a name, a nickname, an occupation, or a time period.

19. The system of claim 6, wherein the at least one of chat bot interaction rules, image classification rules, and data acquisition rules comprises criteria for accessing one or more datasets.

20. The system of claim 19, wherein the image classification rules are configured to compare facial recognition data of the specific entity to labeled image data to determine a label for the specific entity.

* * * * *